(12) United States Patent
Liao

(10) Patent No.: US 9,800,609 B2
(45) Date of Patent: Oct. 24, 2017

(54) METHOD, DEVICE AND SYSTEM FOR DETECTING MALWARE IN A MOBILE TERMINAL

(71) Applicant: Tencent Technology (Shenzhen) Co., Ltd., Shenzhen, Guangdong (CN)

(72) Inventor: Chongliang Liao, Guangdong (CN)

(73) Assignee: Tencent Technology (Shenzhen) Company Limited, Shenzhen, P.R. (CN)

( * ) Notice: Subject to any disclaimer, the term of this patent is extended or adjusted under 35 U.S.C. 154(b) by 8 days.

(21) Appl. No.: 14/622,074

(22) Filed: Feb. 13, 2015

(65) Prior Publication Data
US 2015/0163232 A1 Jun. 11, 2015

Related U.S. Application Data

(63) Continuation of application No. PCT/CN2014/080793, filed on Jun. 26, 2014.

(30) Foreign Application Priority Data

Jul. 30, 2013 (CN) .......................... 2013 1 03261916

(51) Int. Cl.
*H04L 29/06* (2006.01)
*G06F 21/56* (2013.01)
*G06F 9/445* (2006.01)

(52) U.S. Cl.
CPC .............. *H04L 63/145* (2013.01); *G06F 8/61* (2013.01); *G06F 21/563* (2013.01); *G06F 21/567* (2013.01); *G06F 2221/2115* (2013.01)

(58) Field of Classification Search
CPC .......... G06F 8/61; G06F 21/56–21/568; G06F 2221/2115; H04L 63/1416; H04L 63/1441–63/145
See application file for complete search history.

(56) References Cited

U.S. PATENT DOCUMENTS 8,281,399 B1 10/2012 Chen et al.
2009/0282483 A1* 11/2009 Bennett .............. H04L 63/1416
726/23
(Continued)

FOREIGN PATENT DOCUMENTS

CN 102123396 A 7/2011
CN 102663281 A 9/2012
(Continued)

OTHER PUBLICATIONS

Yajin Zhou, Zhi Wang, Wu Zhou, and Xuxian Jiang (Zhou et al.) "Hey, You, Get Off of My Market: Detecting Malicious Apps in Official and Alternative Android Markets", 19th Annual Symposium on Network and Distributed System Security (NDSS Symposium 2012). <http://www.internetsociety.org/sites/default/files/07_5.pdf>. Published: Feb. 7, 2012.*
(Continued)

*Primary Examiner* — Kevin Bechtel
(74) *Attorney, Agent, or Firm* — Brinks Gilson & Lione

(57) ABSTRACT

A method, device and system for detecting malware in a mobile terminal are disclosed. The method includes at least the following operations: obtaining an installation package of a software which is to be checked; decompressing the installation package to obtain a decompressed installation package; detecting the decompressed installation package to obtain a first detection result; sending the decompressed installation package to a cloud system; receiving a second detection result returned from the cloud system based upon the cloud performing a malware check on the decompressed installation package; determining that the software being checked is a malware, if one or both of the following is found: the first detection result and the second detection result each indicates that the decompressed installation package is abnormal.

15 Claims, 4 Drawing Sheets

(56) References Cited

U.S. PATENT DOCUMENTS

| | | | | |
|---|---|---|---|---|
| 2010/0333203 | A1* | 12/2010 | Tsviatkou | G06F 21/566 726/23 |
| 2011/0145920 | A1 | 6/2011 | Mahaffey et al. | |
| 2012/0330801 | A1* | 12/2012 | McDougal | G06F 21/577 705/32 |
| 2013/0263266 | A1* | 10/2013 | Bojaxhi | H04L 63/145 726/23 |

FOREIGN PATENT DOCUMENTS

| | | |
|---|---|---|
| CN | 102663286 A | 9/2012 |
| CN | 102779257 A | 11/2012 |
| CN | 103400076 A | 11/2013 |

OTHER PUBLICATIONS

International Preliminary Report on Patentability and Written Opinion received in PCT Application No. PCT/CN2014/080793 dated Feb. 2, 2016.
International Search Report received in PCT Application No. PCT/CN2014/080793 dated Sep. 26, 2014.
Fang, "Malware Implementation and Detection on Android," *Thesis Submitted to Nanjing University of Posts and Telecommunications for the Degree of Master of Engineering*, Jun. 15, 2013.
Wenjun et al., "A Detection Method and System Implementation for Android Malware," *Journal of Xi'an Jiaotong University*, vol. 47:10, Oct. 2013.
First Office Action received in Chinese Application No. 201310326191.6 dated Jul. 1, 2015.

\* cited by examiner

US 9,800,609 B2

METHOD, DEVICE AND SYSTEM FOR DETECTING MALWARE IN A MOBILE TERMINAL

CROSS-REFERENCE TO RELATED APPLICATIONS

The application is a continuation of PCT Application No. PCT/CN2014/080793, filed on Jun. 26, 2014, which claims priority to Chinese Patent Application No. 2013103261916, filed on Jul. 30, 2013, which may be incorporated by reference in their entireties.

FIELD OF THE TECHNOLOGY

The present disclosure relates to a method, device and system for detecting malware in a mobile terminal in the field of communication technology.

BACKGROUND

With rapid development of communication technologies, mobile terminals such as smartphones and tablet PCs are increasingly popular. It seems that mobile terminals have become an integral part of people's daily life. While enriching people's life and bringing great conveniences to people, such hi-tech products increasingly need to confront information security problems.

For example, providers of illegal software may spread malware over the Internet to infect mobile devices and computers. If a user browses certain malicious websites or downloads certain information, such malware may run in the user's terminal to cause damages: in minor cases, malware may harass people personally, in more serious cases, malware may hunt for and transmit people's personal data (for example, account passwords) to the malware providers, thus compromising people's privacy and financial security. Therefore, dealing with and detecting malware effectively is an urgent issue.

Due to limited processing capacity of a mobile terminal's CPU, mobile terminal usually adopts simple malware detection methods, such as performing simple binary scanning only on feature codes of software application in order to determine whether certain software application is indeed a malware. However, malware usually encrypts its sensitive fields, thus rendering existing malware detection method inadequate in accurately directly detecting malware.

SUMMARY

The embodiments of the present disclosure provide a method, device and system for detecting malware in a mobile terminal accurately.

In an embodiment, a method for detecting malware in a mobile terminal is disclosed. The method includes at least the following operations: obtaining an installation package of a software which is to be checked; decompressing the installation package to obtain a decompressed installation package; detecting the decompressed installation package to obtain a first detection result; sending the decompressed installation package to a cloud system; receiving a second detection result returned from the cloud system based upon the cloud performing a malware check on the decompressed installation package; determining that the software being checked is a malware, if one or both of the following is found: the first detection result and the second detection result each indicates that the decompressed installation package is abnormal.

In another embodiment, a device for detecting malware in a mobile terminal is disclosed. The device operates in conjunction with at least a processor with circuitry and at least a memory which stores instruction codes operable as plurality of units, wherein the plurality of units include: an acquisition unit, which obtains an installation package of a software which is to be checked; a decompressing unit, which decompresses the installation package to obtain a decompressed installation package; a detecting unit, which detects the decompressed installation package to obtain a first detection result; a sending unit, which sends the decompressed installation package to a cloud system; a receiving unit, which receives a second detection result returned from the cloud system based upon the cloud performing a malware check on the decompressed installation package; a determining unit, which determines that the software being checked is a malware, if one or both of the following is found: the first detection result and the second detection result each indicates that the decompressed installation package is abnormal.

In another embodiment, a communication system is disclosed. The communication system may include at least a device for detecting malware in a mobile terminal, wherein the mobile device may be in communication with another communication device and a cloud server through a network, wherein the device operates in conjunction with at least a processor with circuitry and at least a memory which stores instruction codes operable as plurality of units. The plurality of units may include: an acquisition unit, which obtains an installation package of a software which is to be checked; a decompressing unit, which decompresses the installation package to obtain a decompressed installation package; a detecting unit, which detects the decompressed installation package to obtain a first detection result; a sending unit, which sends the decompressed installation package to a cloud system; a receiving unit, which receives a second detection result returned from the cloud system based upon the cloud performing a malware check on the decompressed installation package; a determining unit, which determines that the software being checked is a malware, if one or both of the following is found: the first detection result and the second detection result each indicates that the decompressed installation package is abnormal.

Yet in another embodiment, a non-transitory computer-readable storage medium, wherein the computer readable storage medium stores a program which comprises codes or instructions to cause a processor circuitry to execute operations for detecting malware in a mobile terminal. The operations may include: decompressing the installation package to obtain a decompressed installation package; detecting the decompressed installation package to obtain a first detection result; sending the decompressed installation package to a cloud system; receiving a second detection result returned from the cloud system based upon the cloud performing a malware check on the decompressed installation package; determining that the software being checked is a malware, if one or both of the following is found: the first detection result and the second detection result each indicates that the decompressed installation package is abnormal.

The various embodiments of the present disclosure enables the mobile terminal not only detecting malware locally, but also detected more accurately by a powerful cloud system with more processing resources.

DETAILED DESCRIPTION OF THE EMBODIMENTS

The various embodiments of the present disclosure are further described in details in combination with attached drawings and embodiments below. It should be understood that the specific embodiments described here are used only to explain the present disclosure, and are not used to limit the present disclosure. In addition, for the sake of keeping description brief and concise, the newly added features, or features that are different from those previously described in each new embodiment will be described in details. Similar features may be referenced back to the prior descriptions in a prior numbered drawing or referenced ahead to a higher numbered drawing.

The embodiments of the present disclosure provide a method, a device and a system for detecting malware in a mobile terminal, which may be applied to an Android system. Each of the following embodiments illustrates an exemplary implementation.

Embodiment 1 relates to a device which may be integrated into a mobile terminal for detecting malware in the mobile terminal. The mobile terminal may be a smartphone, a tablet PC, an e-book reader, a MP3 (Moving Picture Experts Group Audio Layer III) player, a MP4 (Moving Picture Experts Group Audio Layer IV) player, a laptop computer, a desktop computer or any electronic device which runs applications and is capable of connecting to a network.

Figure 1:
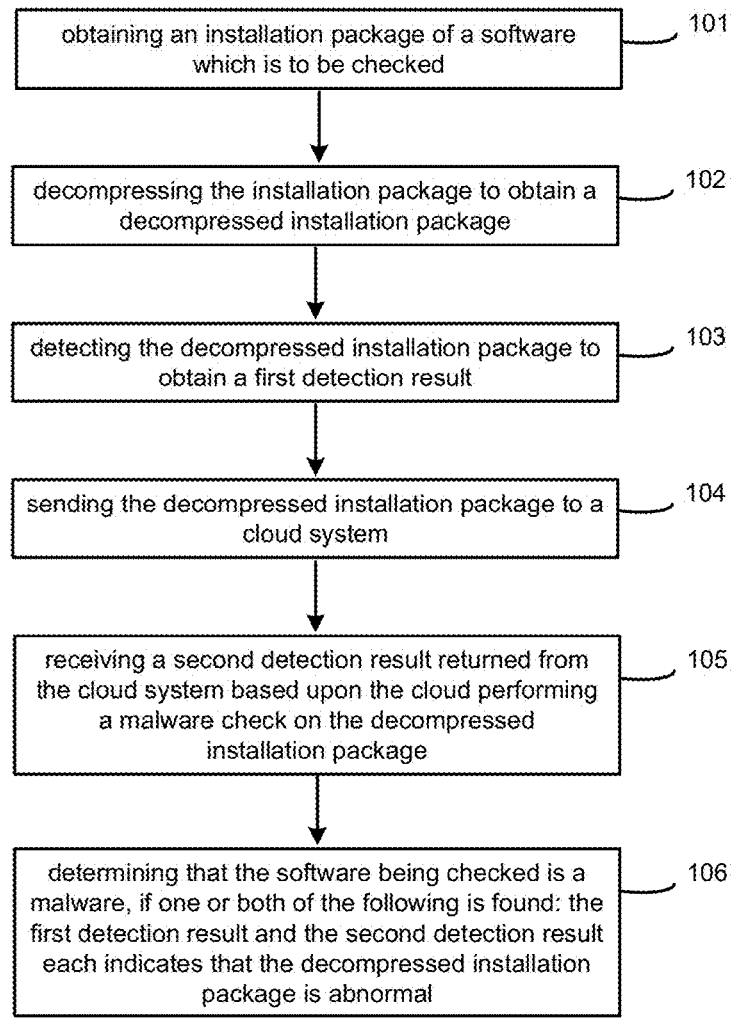
FIG. 1 shows a flowchart which illustrates an exemplary method for detecting malware in a mobile terminal, according to an embodiment of the disclosure.

FIG. 1 shows a flowchart which illustrates an exemplary method for detecting malware in a mobile terminal, according to an embodiment of the disclosure. The exemplary operations may include at least the following steps:

Step 101: Obtaining an installation package of software which is to be checked. For example, the installation package of the software may be an Android Package (APK).

Step 102: Decompressing the installation package of software to obtain a decompressed installation package, such as a decompressed APK in the above example.

Step 103: Detecting the decompressed installation package to obtain a first detection result. The operation may further include the following: (1) performing a heuristic scanning of the decompressed installation package (for example, a decompressed APK), and obtaining a first scanning result, (2) performing a binary scanning to feature codes contained in the decompressed installation package to obtain a second scanning result; (3) performing a authority limits file scanning on the decompressed installation package to obtain a third scanning result; and (4) indicating in the first detection result that the decompressed installation package is abnormal, if anyone of the following is found: the first scanning result, the second scanning result, and the third scanning result each indicates that the decompressed installation package is abnormal.

The heuristic scanning to obtain the first scanning result may include scanning (A) an installation root directory, (B) resource files, and (C) basic dependent library of the decompressed installation package (such as a decompressed APK) respectively. More specifically, each of the scanning in step 103 may further be described as follows:

(A) The performing of the scanning of each of the installation root directory, resource files and basic dependent library of the decompressed installation package, respectively, to obtain the first detection result may include scanning the installation root directory of the decompressed installation package and indicating in the first scanning result that the decompressed installation package is abnormal, if anyone of the following takes place: a preset conventional file is not found under the installation root directory or an abnormal file is found under the installation root directory and wherein the abnormal file is an executable (portable) file, i.e., the abnormal file is not an Executable and Linkable Format (ELF) file or Shell file.

The preset conventional file may be set according to actual needs, for example, the preset conventional file may be an assets file, a res file, a layout file, a dex file, or an Extensible Markup Language (xml) file.

(B) The scanning resource files contained in the decompressed installation package, and indicating in the first scanning result that the decompressed installation package is abnormal, if other types of files exist in addition to the preset file type. The preset file type may be set according to actual needs, for example, resource files may include XML files, PNG files, and MP3 files; so the first scanning result may indicate that the decompressed installation package is abnormal if other types of files exist.

(C) Scanning the basic dependent library (for example, a lib file) contained in the decompressed installation package, and indicating in the first scanning result that the decompressed installation package is abnormal, if there exist other types of files in addition to the preset file type or if a file format does not comply with the preset rules.

In other words, the first scanning result indicates that the decompressed installation package is abnormal, if anyone or more of the above circumstances exists, wherein the preset file type and preset rules may be set according to actual needs. An example of the basic dependent library may be a lib folder, a lib folder generally may contain three file directories including armeabi, armeabiv7, and x86, and the file format must comply with the ELF rules; the first scanning result indicates that the decompressed installation package is abnormal if there exist other types of files.

The performing of binary scanning on feature codes contained in the decompressed installation package (for example, a decompressed APK) may obtain a second scanning result. For example, performing a binary scanning on feature codes (for example, phone numbers and C&C websites) contained in the decompressed installation package, and the second scanning result may indicate that the decompressed installation package is abnormal, if there exist feature codes similar to a preset virus sample.

The performing of an authority limits file scanning on the decompressed installation package (for example, a decompressed APK) may obtain a third scanning result. The performing of the authority limits file scanning on the decompressed installation package may indicate in the third scanning result that the decompressed installation package is abnormal, if there exists a dangerous authority limits combination. The authority limits file may specifically be an AndroidManifest.xml file, which may contain such information as the package name, Activity and Service names, monitored broadcast type, receiver name, and required authorities.

The first detection result may indicate that the decompressed installation package is abnormal, if anyone of the following is found: the first scanning result, second scanning result, and/or third scanning result each indicates that the decompressed installation package is abnormal.

In other words, the first detection result may indicate that the decompressed installation package is abnormal, if anyone or more of the following takes place: the first scanning result, second scanning result, and third scanning result each indicates that the decompressed installation package is abnormal.

Step 104: Sending the decompressed installation package (for example, a decompressed APK) to a cloud system, based upon the cloud system performing a malware detection on the decompressed installation package, and for the convenience of description, the result obtained by the cloud system after performing malware detection is called the second detection result.

Step 104 may further include the following operations:

(1) The cloud system analyzing the authority limits file contained in the decompressed installation package, and obtains an analysis result. For example, the cloud system may indicate in the analysis result that the decompressed installation package may be abnormal, if a name of a data package in the authority limits file contained in the decompressed installation package is the same as or similar to a name of a virus package in a preset database. The cloud system may indicate in the analysis result that the decompressed installation package is abnormal, if a combination of authority limits quantity requested by the decompressed installation package exceeds the combination of authority limits quantity provided by the type of software which is to be checked. The cloud system may indicate in the analysis result that the decompressed installation package is abnormal, if a signature in the authority limits file contained in the decompressed installation package is the same as or similar to a signature of a virus in a preset database.

(2) The cloud system cloud system performing similarity comparison between the codes in executable files contained in the decompressed installation package and codes in a preset sample file, in order to obtain a first comparison result. For example, opening a reverse classes.dex file, clustering and eliminating similar codes, and comparing the similarity between the codes in a sample and the target codes, wherein the similarity may specifically be indicated by a value in a range from 0 to 1.

(3) The cloud system cloud system performing similarity comparison between the Application Programming Interface (API) call a tree of executable files contained in the decompressed installation package and the API call tree in a preset sample file, in order to obtain a second comparison result.

(4) The cloud system indicating in the second detection result, that the decompressed installation package is abnormal, if anyone of the following takes place: the analysis result, the first comparison result and the second comparison result each indicates that the decompressed installation package is abnormal.

Accordingly, the cloud system may indicate in the second detection result that the decompressed installation package is abnormal, if anyone or more of the following takes place: the analysis result, the first comparison result and the second comparison result each indicates that the decompressed installation package is abnormal.

Furthermore, the cloud system may recompile the Dalvik VMware (a Java VMware) in the Android2.2 source codes, log the parameters of some APIs in the sensitive framework layer by using the Hook technology, and run the target decompressed installation package (an APK) by using the recompiled Dalvik VMware to obtain related information, so as to determine whether the decompressed installation package is abnormal.

Step 105: Receiving the second detection result returned from the cloud system based upon the cloud performing a malware check on the decompressed installation package.

Step 106: Determining that the software being checked is a malware, if one or both of the following is found: the first detection result and the second detection result each indicate that the decompressed installation package is abnormal. Otherwise, determining that the software to be checked is not malware if neither the first detection result nor the second detection result indicates that the decompressed installation package is abnormal.

Figure 2A:
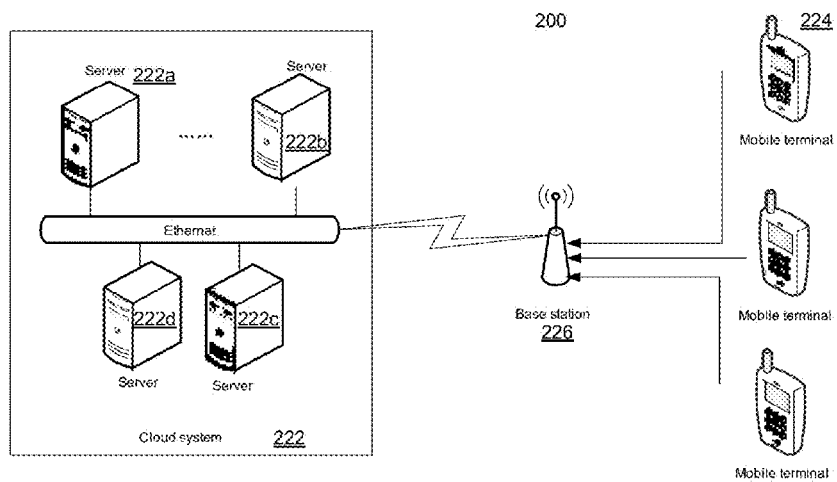
FIG. 2a illustrates an exemplary system diagram implementing a method for detecting malware in a mobile terminal, according to an embodiment of the disclosure.

FIG. 2a illustrates an exemplary system diagram (200) implementing a method for detecting malware in a mobile terminal (224), according to an embodiment of the disclosure. In an embodiment, the device may be integrated into the mobile terminal (224), wherein the mobile terminal may run on an Android system, and the software installation package may be an APK.

As shown in FIG. 2a, the mobile terminal may transfer a decompressed installation package to a cloud system (222) via a base station (226). The cloud system (222) may include multiple servers (222a to 222d), which communicate with each other via an Ethernet and process the decompressed installation package cooperatively. In other words, malware detection may include at least two parts: one part may be implemented within the mobile terminal (224) (also known as an end system), and the other part is implemented in a cloud system (200).

Figure 2B:
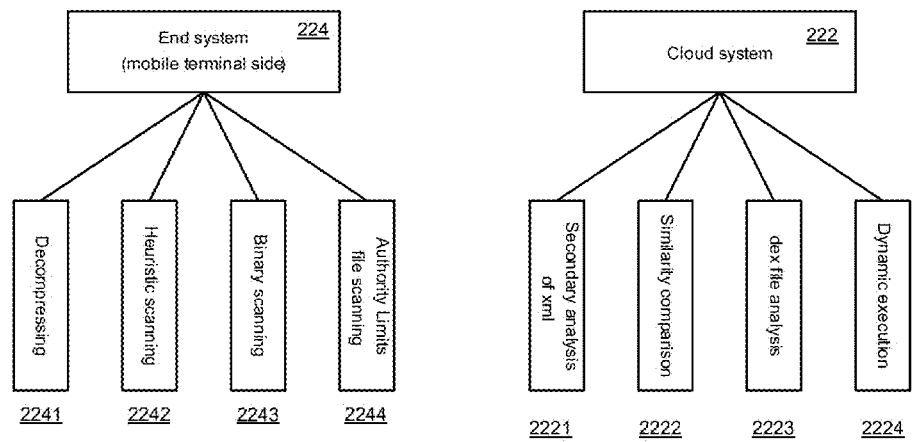
FIG. 2b is an exemplary system diagram depicting an end system and a cloud system, according to an embodiment of the disclosure.

FIG. 2b is an exemplary system diagram depicting an end system and a cloud system, according to an embodiment of the disclosure. As shown in FIG. 2b, the end system (224) (i.e., the mobile terminal) may perform mainly functions such as: decompression (2241), heuristic scanning (2242), binary scanning (2243), and authority limits file scanning (2244). The cloud system (200) may mainly perform functions such as: secondary analysis (2221) of an authority limits file (for example, a xml file), similarity comparison (2222) of the codes contained in the executable files, and an analysis of the dex file (2223), and dynamic execution (2224).

Figure 2C:
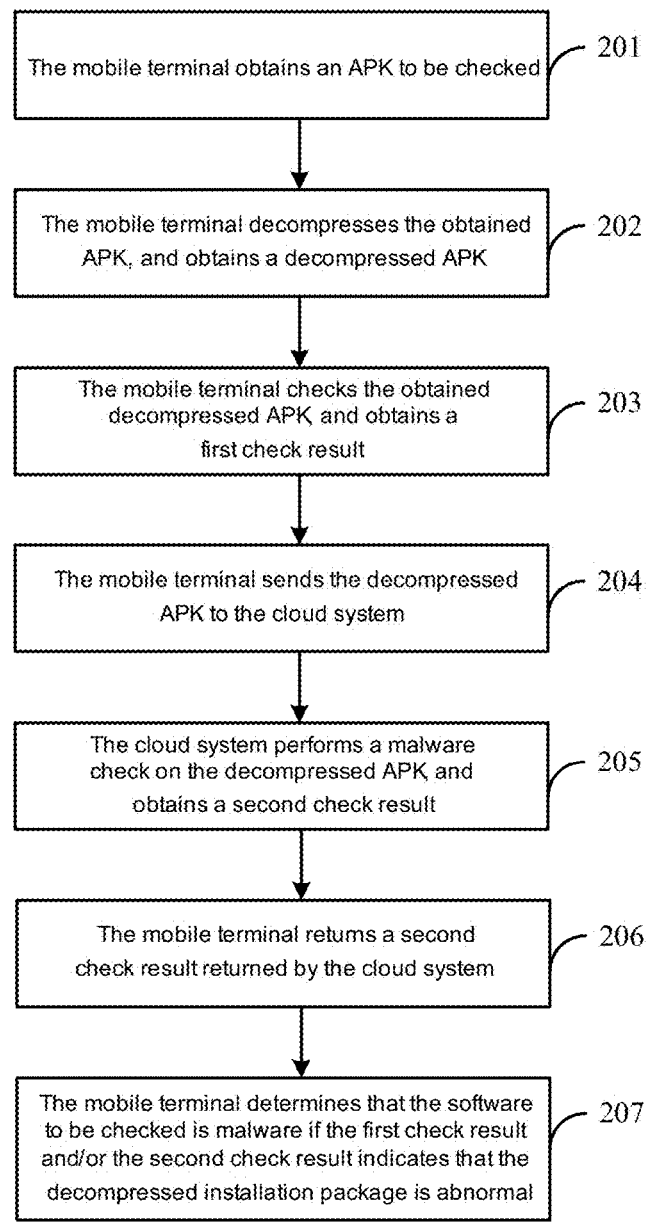
FIG. 2c shows another flowchart which illustrates an exemplary method for detecting malware in a mobile terminal, according to another embodiment of the disclosure.

FIG. 2c shows another flowchart which illustrates an exemplary method for detecting malware in a mobile terminal (224), according to another embodiment of the disclosure. The method may include at least the following operations:

Step 201: The mobile terminal (224) may obtain an APK to be checked.

Step 202: The mobile terminal decompresses the obtained APK to obtain a decompressed APK. For example, the mobile terminal (224) may decompress the APK in a ZIP format and this step therefore may not consume excessive CPU resources because the APK installation process is only a decompression process.

Step 203: The mobile terminal checks the decompressed APK to obtain a first detection result. For example, step 203 may further include the following scanning operations:

(1) Performing a heuristic scanning (2242) of the decompressed APK and obtaining a first scanning result, such as scanning the installation root directory, resource files, and basic dependent library of the decompressed APK respectively, and obtaining a first scanning result.

More specifically, scanning the APK root directory contained in the decompressed APK may detect whether there exists any conventional files (including assets files, res files, layout files, dex files, and xml files) under the APK root directory. If yes, indicate in the first scanning result that the decompressed installation package is abnormal; if there exist some abnormal files (files other than the conventional files) under the APK root directory, determining or judging whether the abnormal files are executable files (portable), for example, determining whether the abnormal files are ELF files or Shell files, and afterwards, indicate in the first scanning result that the decompressed installation package may be abnormal if the abnormal files are executable files.

Furthermore, scanning resource files contained in the decompressed APK may indicate in the first scanning result that the decompressed installation package may be abnormal, if other types of files in addition to the preset file type exist. The preset file type may be set according to actual needs, such as resource files which may include XML files, PNG files, and MP3 files; such that the first scanning result may indicate that the decompressed installation package may be abnormal if other types of files exist.

Yet furthermore, scanning the basic dependent library (for example, a lib file) contained in the decompressed APK may indicate in the first scanning result that the decompressed installation package is abnormal, if there exist other types of files in addition to the preset file type or if a file format does not comply with the preset rules.

In other words, the first scanning result may indicate that the decompressed installation package may be abnormal under one or more of the above circumstances, wherein the preset file type and preset rules may be set according to actual needs. For example, the basic dependent library may be a lib folder, a lib folder generally may contain three file directories including armeabi, armeabiv7, and x86, wherein the file format must comply with the ELF rules; and the first scanning result may indicate that the decompressed installation package may be abnormal if there exist other types of files.

(2) The detecting and checking of the decompressed files may include performing binary scanning (2243) of the feature codes contained in the decompressed APK, and obtaining a second scanning result, such as performing binary scanning on feature codes (for example, phone numbers and C&C websites) contained in the decompressed installation package, and indicating in the second scanning result that the decompressed installation package is abnormal, if there exist feature codes similar to a preset virus sample.

(3) The detecting and checking of the decompressed files may also include performing an authority limits file scanning (2244) on the decompressed APK to obtain a third scanning result, such as scanning an AndroidManifest.xml file (xml file for short), which may contain such information as package names, Activity and Service names, monitored broadcast types, receiver name, and required authorities, to name a few. On the mobile terminal side, the scanning may mainly be checking whether the AndroidManifest.xml file may contain any dangerous authority limits combination, such as virus sample learning, which shows that some viruses may monitor short messages and network status. In this regard, the analysis of the AndroidManifest.xml file may be mainly to check the combination of short message and network authorities. If detected a dangerous authority limits combination, indicates in the third scanning result that the decompressed installation package may be abnormal.

(4) The detecting and checking of the decompressed files may also include indicating in the first detection result that the decompressed APK may be abnormal, if anyone of the following takes places: the first scanning result, second scanning result, and third scanning result each indicates that the decompressed installation package is abnormal.

Accordingly, the first detection result may indicate that the decompressed APK is abnormal if anyone or more of the following takes place: the first scanning result, second scanning result, and third scanning result each indicates that the decompressed APK is abnormal.

Step 204: The mobile terminal (224) sends the decompressed APK to the cloud system (222).

Step 205: Upon receiving the decompressed APK, the cloud system (222) may performs malware detection to the decompressed APK, and obtains a second detection result, for example, step 205 may further include:

(1) The cloud system performs secondary analysis (2221) (which may be different from the analysis of the AndroidManifest.xml file by the mobile terminal) to an authority limits file (for example, an AndroidManifest.xml file) contained in the decompressed APK, and obtains an analysis result. The analysis may perform:

(A). Indicating in the analysis result that the decompressed installation package is abnormal, if the data package name in the authority limits file contained in the decompressed APK is the same as or similar to the virus package name in a preset database;

(B). Indicating in the analysis result that the decompressed installation package is abnormal, if the number of authority limits combinations requested by the decompressed APK exceeds the number of authority limits combinations provided by the type of software being checked. For example, through smart learning, the mobile terminal may determine the minimum number of authority limits combinations required by a certain type of applications; the cloud system may indicate in the analysis result that the decompressed installation package is abnormal, if the target application falls within a certain type, but requires more authority limits combinations.

(C). Indicating in the analysis result that the decompressed installation package is abnormal if the signature in the authority limits file contained in the decompressed APK is the same as or similar to the virus signature in a preset database.

(2) The cloud system may also perform similarity comparison (2222) between the codes in executable files contained in the decompressed APK and the codes in a preset sample file, thereby obtaining a first comparison result.

For example, a reverse classes.dex file may be opened for clustering and eliminating similar codes, and comparing a similarity between the codes in a sample and the target codes. Codes similarity may be indicated by a value over a range from 0 to 1.

(3) The cloud system may generate an API call tree of executable files contained in the decompressed APK reversely, perform similarity comparison between API call tree of executable files contained in the decompressed APK and the API call tree in a preset sample file, and obtain a second comparison result.

(4) The cloud system may indicate in the second detection result that the decompressed installation package is abnormal, if anyone or more of: the analysis result, first comparison result and second comparison result each indicates that the decompressed APK is abnormal.

Accordingly, the cloud system (222) may indicate in the second detection result that the decompressed APK is abnormal if one or more of the following takes place: the analysis result, first comparison result and second comparison result each indicates that the decompressed APK is abnormal.

Furthermore, the cloud system (222) may recompile a Dalvik VMware (a Java VMware) in the Android2.2 source codes, log the parameters of some APIs in the sensitive framework layer by using the Hook technology, and run the target decompressed APK by using the recompiled Dalvik VMware to obtain related information, so as to determine whether the decompressed installation package is abnormal.

Step 206: The mobile terminal (224) returns a second detection result returned by the cloud system (222).

Step 207: The mobile terminal (224) determines that the software to be checked may be malware, if anyone or more of the following takes place: the first detection result and the second detection result each indicate that the decompressed installation package is abnormal.

The mobile terminal (222) determines that the software to be checked is not malware if neither the first detection result nor the second detection result indicates that the decompressed installation package is abnormal.

To sum up, this embodiment of the present disclosure comprises: obtaining an APK to be checked; decompressing the APK and obtaining a decompressed APK; on one hand, detecting the decompressed APK and thus obtaining a first detection result; on the other hand, sending the decompressed APK to a cloud system, and receiving a second detection result that the cloud system returns upon performing a malware check on the decompressed APK; determining that the software to be checked is malware if the first detection result and/or the second detection result indicates that the decompressed installation package is abnormal.

The present disclosure may not only detect malware locally, but also further detect malware in a powerful cloud system (222), thereby detecting malware more accurately. Further, the cloud system (222) may perform the operations which may consume much more CPU resources than the mobile terminal (224) could perform, thereby improving malware detection efficiency and increase the performance of the mobile terminal, thus providing security to the mobile terminal.

Figure 3:
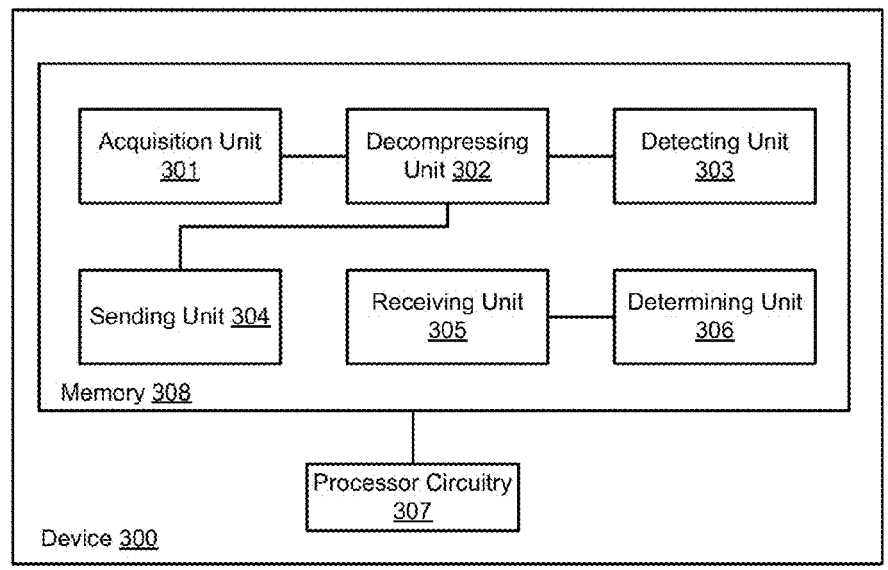
FIG. 3 shows a simplified structure diagram of a mobile terminal which detects malware, according to an embodiment of the disclosure.

FIG. 3 shows a simplified structure diagram of a mobile terminal (300) which detects malware, according to an embodiment of the disclosure. The device (300) may operates in conjunction with at least a processor with circuitry (307) and at least a memory (308) which stores instruction codes operable as plurality of units, wherein the plurality of units may include at least:

an acquisition unit (301) which obtains an installation package of a software which is to be checked; for example, the installation package of the software may be an APK;

a decompressing unit (302), which decompresses the installation package from the acquisition unit (301) and to obtain a decompressed installation package;

a detecting unit (303), which detects the decompressed installation package from the decompressing unit (302) to obtain a first detection result;

a sending unit (304), which sends the decompressed installation package from the decompressing unit (302) to a cloud system;

a receiving unit (305), which receives a second detection result returned from the cloud system based upon the cloud performing a malware check on the decompressed installation package;

a determining unit (306), which determines that the software being checked is a malware, if one or both of the following is found: the first detection result and the second detection result each indicates that the decompressed installation package is abnormal.

The detecting unit (303) may further include a first scanning subunit, a second scanning subunit, a third scanning subunit, and an analysis subunit; wherein the first scanning subunit may be used to perform a heuristic scanning of the decompressed installation package, and obtain a first scanning result.

The first scanning subunit may scan the installation root directory, resource files and basic dependent library of the decompressed installation package respectively, and obtain a first scanning result. For example the scanning operation may include:

(A) Scanning the installation root directory of the decompressed installation package, and indicating in the first scanning result that the decompressed installation package is abnormal, if anyone or more of the following takes place: the preset conventional file is not found under the installation root directory or if an abnormal file is found under the installation root directory and the abnormal file is executable (portable), such as the abnormal file is not an ELF file or Shell file. Wherein the preset conventional file may be set according to actual needs, such as the preset conventional file may be an assets file, a res file, a layout file, a dex file, or an xml file.

(B) Scanning resource files contained in the decompressed installation package, and indicating in the first scanning result that the decompressed installation package is abnormal, if there exist other types of files in addition to the preset file type. Wherein the preset file type may be set according to actual needs, such as the resource files may include XML files, PNG files, and MP3 files; so the first scanning result may indicate that the decompressed installation package is abnormal if other types of files exist.

(C) Scanning the basic dependent library (for example, a lib file) contained in the decompressed installation package, and indicating in the first scanning result that the decompressed installation package is abnormal, if there exist other types of files in addition to the preset file type or if a file format does not comply with the preset rules.

Accordingly, the first scanning result indicates that the decompressed installation package is abnormal under one or more of the above circumstances, wherein the preset file type and preset rules may be set according to actual needs; taking it as an example that the basic dependent library is a lib folder, a lib folder generally may contain three file directories including armeabi, armeabiv7, and x86, and the file format must comply with the ELF rules; the first scanning result indicates that the decompressed installation package is abnormal if there exist other types of files.

The second scanning subunit may perform binary scanning on feature codes contained in the decompressed installation package, and obtain a second scanning result. For example, the second scanning unit may perform binary scanning on feature codes contained in the decompressed installation package, and the second scanning result may indicate that the decompressed installation package is abnormal, if feature codes similar to a preset virus sample exist.

The third scanning subunit may perform authority limits file scanning on the decompressed installation package, and obtain a third scanning result. For example, the third scanning unit may perform an authority limits file scanning on the decompressed installation package, and the third scanning result may indicate that the decompressed installation package is abnormal, if there exists a dangerous authority limits combination. Wherein the authority limits file may be an AndroidManifest.xml file, which may contain such information as package names, Activity and Service names, monitored broadcast types, receiver name, and required authorities.

The analysis subunit may be used to indicate in the first detection result that the decompressed installation package is abnormal, if anyone or more of the following takes place: the first scanning result, the second scanning result, and the third scanning result indicates that the decompressed installation package is abnormal.

The device for detecting malware in a mobile terminal may be integrated in a mobile terminal, which may be a smartphone, a tablet PC, an e-book reader, a MP3 player, a MP4 player, a laptop computer, or a desktop computer.

Specifically, the above units may be carried out as independent entities or be combined at will first and then be carried out as one or multiple entities. For details on the specific implementation of each unit, refer to the foregoing described embodiments.

To sum up, the device for detecting malware in a mobile terminal provided in this embodiment may work as follows: The acquisition unit (301) may obtain installation package of software to be checked; the decompressing unit (302) may decompress the installation package and obtain a decompressed installation package. On one hand, the detecting unit (303) may check the decompressed installation packages and obtain a first detection result. On the other hand, the sending unit (304) may send the decompressed installation package to a cloud system. The receiving unit (305) may receive a second detection result such that the cloud system may return upon performing a malware check on the decompressed installation package. The determining unit (306) may determine that the software to be checked is malware if anyone or the following takes place: the first detection result and the second detection result, each indicates that the decompressed installation package is abnormal.

The present disclosure may not only detect malware locally, but also further detect malware in a powerful cloud system (202). The additional resources in the cloud system enable detecting malware more accurately. Further, the cloud system may perform the operations that consume many CPU resources and the mobile terminal only performs some operations that consume few CPU resources, thereby improving the execution efficiency and performance of the mobile terminal, and improving user experience.

Figure 4:
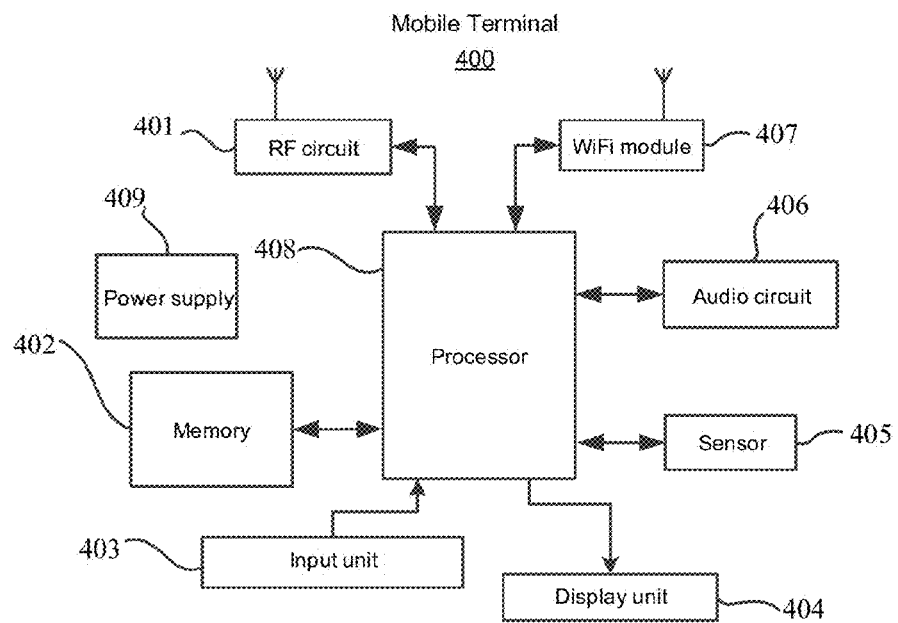
FIG. 4 shows an exemplary functional structure diagram of a mobile terminal which detects malware, according to an embodiment of the disclosure.

FIG. 4 shows an exemplary functional structure diagram of a mobile terminal (400) which detects malware, according to an embodiment of the disclosure. The device (300) embodiment in FIG. 3 may correspond to at least the memory (402) and the processor (408) portion of the mobile terminal (400). In another embodiment, the device itself may also be the mobile terminal (400).

The following section may briefly provide some functional descriptions on the mobile terminal (400). The mobile terminal (400) may obtain an installation package of a software which is to be checked; decompress the installation package to obtain a decompressed installation package; detect the decompressed installation package to obtain a first detection result; send the decompressed installation package to a cloud system; and receive a second detection result returned from the cloud system based upon the cloud performing a malware check on the decompressed installation package. The mobile terminal (400) may determine that the software being checked may be a malware, if one or both of the following is found: the first detection result and the second detection result each indicates that the decompressed installation package is abnormal.

In another embodiment, the mobile terminal (400) may communicate with a communication system (200), such as the one shown in FIG. 2a. The communication system (200) may include one or more cloud servers (202a-202f). The cloud server (202a) may receive the decompressed installation package sent by the mobile terminal (400), perform malware detection to the decompressed installation package, obtain the second detection result, and send the second detection result to the mobile terminal (400). Wherein, the method of detecting the decompressed installation package by the cloud server (the cloud system in the foregoing embodiments) has been described in detail in the foregoing embodiments (see FIGS. 2a-2c, 3) of the malware detection method.

The communication system (200) may include the device (300) (see FIG. 3) which may be integrated into the mobile terminal (400) for detecting malware in the mobile terminal (400).

As shown in FIG. 4. The mobile terminal may include at least a Radio Frequency (RF) circuit (401), one or multiple non-transitory computer-readable memories (402) which may include a plurality of units (301-306 in FIG. 3) for carrying out the malware detection operations, an input unit (403), a display unit (401), a sensor (405), an audio circuit (406), a Wireless Fidelity (WiFi) module (407), one or multiple core processors (408), and a power supply (409). A person skilled in the art may recognize that the mobile terminal (400) structure may include more or less parts than what is shown in FIG. 4, such as certain assembled parts, or different part layouts.

The RF circuit (401) may be used to receive/send messages or receive/send signals during a conversation; especially forwarding a downlink message received from a base station to one or multiple processors (408) for processing, and sending the involved uplink data to the base station. Usually, the RF circuit (401) comprises (but not limited to) an antenna, at least one amplifier, a tuner, one or multiple oscillators, a Subscriber Identity Module (SIM), a transceiver, a coupler, a Low Noise Amplifier (LNA), and a duplexer.

The RF circuit (401) may also communicate with a network and other equipment via wireless communication. The wireless communication may use any communication standard or protocol, including (but not limited to) Global System of Mobile Communication (GSM), General Packet Radio Service (GPRS), Code Division Multiple Access (CDMA), Wideband Code Division Multiple Access (WCDMA), Long Term Evolution (LTE), Email, and Short Messaging Service (SMS).

The memory (402) may be used to store software programs and modules. By running a software program or module stored in the memory (402), the processor (408) may execute various functional applications and data processing. The memory (402) includes a program storage area and a data storage area, wherein the program storage area may store an operating system, application programs required by at least one function (for example, the audio playing function and image playing function), and the data storage area may store data (for example, audio data and telephone directory) created for use of the terminal. Additionally, the memory (402) may be a high-speed random access memory (RAM) and a non-volatile memory (NVM). Optionally, it may include at least one disk storage device, a flash memory device, or a volatile solid memory device of another type. Correspondingly, the memory (402) may include a memory controller, which enables the processor (408) and the input unit (403) to access the memory (402).

The input unit (403) may be used to receive the inputted numerical or character information, and generate keyboard inputs, mouse inputs, operating rod inputs, optical inputs, or trackball signal inputs related to user setting and functional control. In a specific embodiment, the input unit (403) may be a touch-sensitive surface or another input device. The touch-sensitive surface, also called touch screen or touch pad, may collect the touch operations performed by a user on or nearby it (for example, touch operations that a user performs on or nearby the touch-sensitive surface by using a finger, a touch pen or other appropriate objects or accessories), and drive the associated connecting device according to the preset program. Optionally, the touch-sensitive surface may comprise two parts: a touch detection device and a touch controller. The contact detection device detects the touching position of the user and the signal brought by the touch operation, and then sends the signal to the touch controller. The touch controller receives touch information from the touch detection device, converts the touch information into touch spot coordinates, and then sends the touch spot coordinates to the processor (408). The touch controller may also receive and then execute commands sent by the processor (408). In addition, the touch-sensitive surface may be implemented as diversified types including the resistance type, capacitive type, infrared ray, and surface acoustic wave type. In addition to the touch-sensitive surface, the input unit (403) may also include other input devices. Specifically, other input devices may include (but not limited to) one or more of a physical keyboard, functional buttons (for example, the volume control button and switch button), a trackball, mouse, and n operating rod.

The display unit (404) may be used to display the information inputted/provided by/for a user and various graphic user interfaces (GUIs). The GUIs may be made up of graphs, texts, icons, video, and any combination of them. The display unit (404) may include a display panel, which may optionally be configured as a Liquid Crystal Display (LCD), an Organic Light-Emitting Diode (OLED), and so on. Further, the touch-sensitive surface may overlap the display panel. When detecting a touch operation on or nearby it, the touch-sensitive surface transfers the operation to the processor (408) for determining the type of the touch event. Subsequently, the processor (408) may provide associated visual outputs on the display panel according to the type of the touch event. Although the touch-sensitive surface and the display panel are two independent parts used to implement the input and input functions as shown in FIG. 4, the touch-sensitive surface may be integrated with the display panel to implement the input and input functions in certain embodiments.

The mobile terminal may include at least one sensor (405), for example, an optical sensor, a motion sensor or another type of sensor. Specifically, the optical sensor may comprise an ambient light sensor and a proximity sensor, wherein the ambient light sensor may adjust the brightness of the display panel according to the darkness/brightness of ambient light, and the proximity sensor may turn off the display panel and/or the backlight when the mobile terminal is moved close to the ear. As a motion sensor, the gravity acceleration sensor may detect the accelerated speed in each direction (triaxial usually), detect the magnitude and direction of gravity in a stationary state, identify the applications of the mobile phone attitude (for example, switching between landscape and portrait screens, related games, and attitude calibration of magnetometer), and perform the functions related to vibration identification (for example, pedometer and knocking); the mobile terminal may also be fitted with a gyroscope, barometer, hygrometer, thermometer, infrared sensor and other types of sensors, which are not detailed here.

The audio circuit (406), the loudspeaker and the microphone may provide audio interfaces between the user and the mobile terminal. On one hand, the audio circuit (406) may transmit the electrical signal obtained by converting the received audio data to the loudspeaker, and then the loudspeaker converts the electrical signal into an output sound signal; on the other hand, the microphone converts the collected sound signal into an electrical signal and sends the electrical signal to the audio circuit (406), and the audio circuit (406) converts the received electrical signal into audio data and sends the audio data to the processor (408) for processing; the processed audio data may be sent to another mobile terminal via the RF circuit (401) or be outputted to the memory (402) for further processing. The audio circuit (406) may further include an earphone jack, so as to provide communication between an external earphone and a mobile terminal.

WiFi is a short-distance wireless transmission technology. The mobile terminal (400) may help the user receive/send Emails, browse Web pages, and access streaming media via the WiFi module (407), which enables the user to access the broadband Internet in a wireless manner. Although FIG. 4 shows the WiFi module (407), it may be understood that the WiFi module (407) is not an indispensable part of the mobile terminal, and may be omitted as needed without changing the essence of the present disclosure.

As the control center of the mobile terminal, the processor (408) connects different parts of the mobile terminal by means of various interfaces and lines, and implements various functions of the terminal and processes data by running or executing the software program and/or module stored in the memory (402) and invoking the data stored in the memory (402), thereby performing overall monitoring to the mobile phone. Optionally, the processor (408) may comprise one or multiple processing cores; preferably, the processor (408) may integrate an application processor and a modem processor, wherein the application processor mainly processes the operating system, user interfaces and applications, and the modem processor mainly processes wireless communication. It may be understood that the modem processor may not be integrated in the processor (408).

The mobile terminal also comprises the power supply (409) (for example, a battery) that supplies power to different parts. Preferably, the power supply may be connected to the processor (408) logically via a power management system, so that the power management system may implement such functions as charging management, discharging management, and power consumption management. The power supply (409) may further comprise one or multiple DC/AC power supplies, a recharging system, a power failure detection circuit, a power converter or inverter, and a power status indicator.

The mobile terminal may comprise such parts as a camera and a Bluetooth module though they are not illustrated here. In this embodiment, specifically, the processor (408) in the mobile terminal may load the executable files associated with the processes of one or multiple applications to the memory (402) according to the following instructions, and run the applications stored in the memory (402), thereby implementing various functions.

The mobile terminal (400) may also include parts such as a camera and a Bluetooth module though they are not illustrated here. In this embodiment, specifically, the display unit of the mobile terminal is a touch screen and the mobile terminal further includes a memory and one or multiple programs, wherein one or multiple the programs (such as a malware detection program) may be stored in the memory, and one or multiple processors (408) and circuitry may be configured to execute the instructions that are contained in one or multiple the programs for performing the following operations: obtaining an installation package of a software which is to be checked; decompressing the installation package to obtain a decompressed installation package; detecting the decompressed installation package to obtain a first detection result; sending the decompressed installation package to a cloud system; receiving a second detection result returned from the cloud system based upon the cloud performing a malware check on the decompressed installation package; determining that the software being checked is a malware, if one or both of the following is found: the first detection result and the second detection result each indicates that the decompressed installation package is abnormal. The specific details in implementation of each above step have been described in the related foregoing embodiment as shown in FIGS. 1 to 3.

To sum up, the disclosure of the various embodiments not only enable malware detection locally, but also enable more accurate malware detection on a powerful cloud system (202) with more CPU resources, that malware may be detected more thoroughly and accurately, thus improving user's mobile terminal security.

It should be understood by those with ordinary skill in the art that all or some of steps of the foregoing embodiments may be implemented by hardware, or software program codes stored on a non-transitory computer-readable storage medium with computer-executable commands stored within. For example, the disclosure may be implemented as an algorithm as codes stored in a program module or a system with multi-program-modules. The computer-readable storage medium may be, for example, nonvolatile memory such as compact disc, hard drive. ROM or flash memory.

The foregoing represents only some preferred embodiments of the present disclosure and their disclosure may not be construed to limit the present disclosure in any way. Those of ordinary skill in the art may recognize that equivalent embodiments may be created via slight alterations and modifications using the technical content disclosed above without departing from the scope of the technical solution of the present disclosure, and such summary alterations, equivalent has changed and modifications of the foregoing embodiments may be to be viewed as being within the scope of the technical solution of the present disclosure.

What is claimed is:

1. A method for improving security in a mobile terminal through detecting malware in the mobile terminal, comprising the mobile terminal performing:

obtaining an installation package of a software which is compressed;

decompressing the installation package to obtain a decompressed installation package in order to check if malware is detected in the compressed installation package;

performing detection on the decompressed installation package to obtain a first detection result by performing all of the following:

performing heuristic scanning of the decompressed installation package to obtain a first scanning result, wherein the heuristic scanning being scanning one of:

scanning an installation root directory, wherein the first scanning result indicates malware if an Executable and Linkable Format (ELF) file is detected;

scanning a resource file, wherein the first scanning result indicates malware if a file of a type other than types of files in a preset file type is detected; and scanning a dependent library of the decompressed installation package, wherein the first scanning result indicates malware if a file of a type other than types of files in the preset file type is detected or if a file whose format does not comply with preset rules;

performing binary scanning on feature codes in the decompressed installation package to obtain a second scanning result, wherein the second scanning result indicates malware if the feature codes contain phone numbers and websites that are similar to a preset virus sample; and performing authority limits file scanning on the decompressed installation package to obtain a third scanning result, wherein the authority limits file scanning being scanning of a manifest authority limits file that comprises: a package file, a service, a monitored broadcast type, and a receiver;

indicating in the first detection result that the decompressed installation package is found to have malware, if anyone of the first scanning result, the second scanning result, and the third scanning result indicates malware;

afterwards, sending only the decompressed installation package to a cloud system to perform additional malware checks which have not been performed by the mobile terminal, wherein the additional malware checks include generating an Application Programming Interface (API) call tree of executable files contained in the decompressed installation package and performing a similarity comparison between the API call tree of the executable files contained in the decompressed installation package and an API call tree in a preset virus sample file;

receiving a second detection result returned from the cloud system based upon the cloud performing the additional malware checks on the decompressed installation package;

determining that the software being checked is harmful to the mobile terminal, if both the first detection result and the second detection result indicate that the decompressed installation package is found to have malware; and deleting the decompressed installation package from the mobile terminal.

2. The method according to claim 1, wherein the performing of the heuristic scanning of the decompressed installation package to obtain a first scanning result, comprising:

scanning each of an installation root directory, resource files and basic dependent library of the decompressed installation package, respectively, to obtain the first scanning result.

3. The method according to claim 2, wherein the performing of the scanning of each of the installation root directory, resource files and basic dependent library of the decompressed installation package, respectively, to obtain the first detection result, comprising:

scanning the installation root directory of the decompressed installation package and indicating in the first scanning result that the decompressed installation package is found to have malware, if anyone of the following takes place: that a preset conventional file comprising anyone of an assets file, a res file, a layout file, a dex file, and a xml files cannot be found under the installation root directory or a malware infected file is found under the installation root directory and wherein the malware infected file is an executable file;

scanning resource files contained in the decompressed installation package, and indicating in the first scanning result that the decompressed installation package is found to have malware, if there exist other types of files in addition to a preset file type;

scanning the basic dependent library contained in the decompressed installation package, and indicating in the first scanning result that the decompressed installation package is found to have malware, if there exist other types of files in addition to the preset file type or if a file format does not comply with preset rules.

4. The method according to claim 1, wherein the performing of the manifest authority limits file scanning on the decompressed installation package to obtain the third scanning result, comprising:

performing the authority limits file scanning on the decompressed installation package, and indicating in the third scanning result that the decompressed installation package is found to have malware, if there exists a combination of limited rights that results in malware attacks to the mobile terminal.

5. The method according to claim 1, wherein the malware check on the decompressed installation package by the cloud system, comprising:

the cloud system analyzing the manifest authority limits file contained only in the decompressed installation package, and obtaining an analysis result;

the cloud system performing similarity comparison between codes in executable files contained only in the decompressed installation package and codes in a preset sample file, in order to obtain a first comparison result;

the cloud system performing similarity comparison between the Application Programming Interface (API) call tree of executable files contained only in the decompressed installation package and the API call tree in a preset sample file, in order to obtain a second comparison result;

indicating in the second detection result, that only the decompressed installation package is found to have malware if the analysis result, the first comparison result and the second comparison result each found to exhibit one or more of:

when a combination of authority limits quantity requested by only the decompressed installation package exceeds the combination of authority limits quantity provided by a type of software which is to be checked;

when a signature in the authority limits file contained only in the decompressed installation package is the same as or similar to a signature of a virus in a preset database.

6. The method according to claim 5, wherein the analyzing of the manifest authority limits file contained only in the decompressed installation package by the cloud system to obtain the analysis result, comprising:

the cloud system indicating in the analysis result that only the decompressed installation package is found to have malware, if a name of a data package in the authority limits file contained only in the decompressed installation package is the same as or similar to a name of a virus package in a preset database.

7. A device for improving security through detecting malware in a mobile terminal, the device comprising one or more computer processors with circuitry and at least a non-transitory memory with computer-executable instructions stored thereon that, when executed by the one or more computer processors, cause the mobile device to:

obtain an installation package of a software which is compressed;

decompress the installation package to obtain a decompressed installation package in order to check if malware is detected in the compressed installation package;

perform detection on the decompressed installation package to obtain a first detection result, by further configuring the device to perform all of the following:

perform heuristic scanning of the decompressed installation package to obtain a first scanning result, wherein the heuristic scanning being scanning one of:

an installation root directory, wherein the first scanning result indicates malware if an Executable and Linkable Format (ELF) file is detected;

a resource file, wherein the first scanning result indicates malware if a file of a type other than types of files in a preset file type is detected; and a dependent library of the decompressed installation package, wherein the first scanning result indicates malware if a file of a type other than types of files in the preset file type is detected or if a file whose format does not comply with preset rules;

perform binary scanning on feature codes in the decompressed installation package to obtain a second scanning result, wherein the second scanning result indicates malware if the feature codes contain phone numbers and websites that are similar to a preset virus sample; and perform authority limits file scanning on the decompressed installation package to obtain a third scanning result, wherein the authority limits file scanning being scanning of a manifest authority limits file that comprises: a package file, a service, a monitored broadcast type, and a receiver;

indicate in the first detection result that the decompressed installation package is found to have malware, if anyone of the first scanning result, the second scanning result, and the third scanning result indicates malware;

afterwards, send only the decompressed installation package to a cloud system to perform additional malware checks which have not been performed by the mobile terminal, wherein the additional malware checks include generating an Application Programming Interface (API) call tree of executable files contained in the decompressed installation package and performing a similarity comparison between the API call tree of the executable files contained in the decompressed installation package and an API call tree in a preset virus sample file;

receive a second detection result returned from the cloud system based upon the cloud performing the additional malware checks on the decompressed installation package;

determine that the software being checked is harmful to the mobile terminal, if the first detection result and the second detection result indicate that the decompressed installation package is found to have malware; and delete the decompressed installation package from the mobile terminal.

8. The device according to claim 7, wherein
the first scanning subunit further scans each of an installation root directory, resource files and basic dependent library of the decompressed installation package, respectively, to obtain the first scanning result.

9. The device according to claim 8, wherein the device is further configured to:

scan the installation root directory of the decompressed installation package and indicating in the first scanning result that the decompressed installation package is found to have malware, if anyone of the following takes place: that a preset conventional file comprising anyone of an assets file, a res file, a layout file, a dex file, and a xml files cannot be found under the installation root directory or a malware infected file is found under the installation root directory and wherein the malware infected file is an executable file;

scan resource files contained in the decompressed installation package, and indicating in the first scanning result that the decompressed installation package is found to have malware, if there exist other types of files in addition to a preset file type;

scan the basic dependent library contained in the decompressed installation package, and indicating in the first scanning result that the decompressed installation package is found to have malware, if there exist other types of files in addition to the preset file type or if a file format does not comply with preset rules.

10. The device according to claim 7, wherein
the third scanning unit further performs the manifest authority limits file scanning on the decompressed installation package, and indicating in the third scanning result that the decompressed installation package is found to have malware, if there exists a combination of limited rights that results in malware attacks to the mobile terminal.

11. A communication system for improving security in a mobile terminal, the communication system comprising a device for detecting malware in the mobile terminal, wherein the mobile device is in communication with another communication device and a cloud server through a network, wherein the device comprises one or more computer processors with circuitry and at least a non-transitory memory with computer-executable instructions stored thereon that, when executed by the one or more computer processors, cause the mobile terminal to:

obtain an installation package of a software which is compressed;

decompress the installation package to obtain a decompressed installation package in order to check if malware is detected in the compressed installation package;

perform detection on the decompressed installation package to obtain a first detection result, by further configuring the device to perform all of the following:

perform heuristic scanning of the decompressed installation package to obtain a first scanning result, wherein the heuristic scanning being scanning one of:

an installation root directory, wherein the first scanning result indicates malware if an Executable and Linkable Format (ELF) file is detected;

a resource file, wherein the first scanning result indicates malware if a file of a type other than types of files in a preset file type is detected; and a dependent library of the decompressed installation package, wherein the first scanning result indicates malware if a file of a type other than types of files in the preset file type is detected or if a file whose format does not comply with preset rules;

perform binary scanning on feature codes in the decompressed installation package to obtain a second scanning result, wherein the second scanning result indicates malware if the feature codes contain phone numbers and websites that are similar to a preset virus sample; and perform authority limits file scanning on the decompressed installation package to obtain a third scanning result, wherein the authority limits file scanning being scanning of a manifest authority limits file that comprises: a package file, a service, a monitored broadcast type, and a receiver;

indicate in the first detection result that the decompressed installation package is found to have malware, if anyone of the first scanning result, the second scanning result, and the third scanning result indicates malware;

afterwards, send only the decompressed installation package to a cloud system to perform additional malware checks which have not been performed by the mobile terminal, wherein the additional malware checks include generating an Application Programming Interface (API) call tree of executable files contained in the decompressed installation package and performing a similarity comparison between the API call tree of the executable files contained in the decompressed installation package and an API call tree in a preset virus sample file;

receive a second detection result returned from the cloud system based upon the cloud performing the additional malware checks on the decompressed installation package;

determine that the software being checked is harmful to the mobile terminal, if the first detection result and the second detection result indicate that the decompressed installation package is found to have malware; and delete the decompressed installation package from the mobile terminal.

12. A non-transitory computer-readable storage medium, wherein the computer readable storage medium stores a program which comprises codes or instructions to cause a processor circuitry to execute operations for improving security through detecting malware in a mobile terminal, the operations comprising the mobile terminal performing:

obtaining an installation package of a software which is compressed;

decompressing the installation package to obtain a decompressed installation package in order to check if malware is detected in the compressed installation package;

performing detection on the decompressed installation package to obtain a first detection result by performing all of the following:

performing heuristic scanning of the decompressed installation package to obtain a first scanning result, wherein the heuristic scanning being scanning one of:

scanning an installation root directory, wherein the first scanning result indicates malware if an Executable and Linkable Format (ELF) file is detected;

scanning a resource file, wherein the first scanning result indicates malware if a file of a type other than types of files in a preset file type is detected; and scanning a dependent library of the decompressed installation package, wherein the first scanning result indicates malware if a file of a type other than types of files in the preset file type is detected or if a file whose format does not comply with preset rules;

performing binary scanning on feature codes in the decompressed installation package to obtain a second scanning result, wherein the second scanning result indicates malware if the feature codes contain phone numbers and websites that are similar to a preset virus sample; and performing authority limits file scanning on the decompressed installation package to obtain a third scanning result, wherein the authority limits file scanning being scanning of a manifest authority limits file that comprises: a package file, a service, a monitored broadcast type, and a receiver;

indicating in the first detection result that the decompressed installation package is found to have malware, if anyone of the first scanning result, the second scanning result, and the third scanning result indicates malware;

afterwards, sending only the decompressed installation package to a cloud system to perform additional malware checks which have not been performed by the mobile terminal, wherein the additional malware checks include generating an Application Programming Interface (API) call tree of executable files contained in the decompressed installation package and performing a similarity comparison between the API call tree of the executable files contained in the decompressed installation package and an API call tree in a preset virus sample file;

receiving a second detection result returned from the cloud system based upon the cloud performing the additional malware checks on the decompressed installation package;

determining that the software being checked is harmful to the mobile terminal, if both the first detection result and the second detection result indicate that the decompressed installation package is found to have malware; and deleting the decompressed installation package from the mobile terminal.

13. The non-transitory computer readable storage medium according to claim 12, wherein the performing of the heuristic scanning of the decompressed installation package to obtain a first scanning result, comprising:

scanning each of an installation root directory, resource files and basic dependent library of the decompressed installation package, respectively, to obtain the first scanning result.

14. The non-transitory computer readable storage medium according to claim 13, wherein the performing of the scanning of each of the installation root directory, resource files and basic dependent library of the decompressed installation package, respectively, to obtain the first detection result, comprising:

scanning the installation root directory of the decompressed installation package and indicating in the first scanning result that the decompressed installation package is found to have malware, if anyone of the following takes place: that a preset conventional file comprising anyone of an assets file, a res file, a layout file, a dex file, and a xml files cannot be found under the installation root directory or a malware infected file is found under the installation root directory and wherein the malware infected file is an executable file;

scanning resource files contained in the decompressed installation package, and indicating in the first scanning result that the decompressed installation package is found to have malware, if there exist other types of files in addition to a preset file type;

scanning the basic dependent library contained in the decompressed installation package, and indicating in the first scanning result that the decompressed installation package is found to have malware, if there exist other types of files in addition to the preset file type or if a file format does not comply with preset rules.

15. The non-transitory computer readable storage medium according to claim 12, wherein the performing of the manifest authority limits file scanning on the decompressed installation package to obtain the third scanning result, comprising:

performing the authority limits file scanning on the decompressed installation package, and indicating in the third scanning result that the decompressed installation package is found to have malware, if there exists a combination of limited rights that results in malware attacks to the mobile terminal.

\* \* \* \* \*